(12) United States Patent
Boendel et al.

(10) Patent No.: US 11,400,402 B2
(45) Date of Patent: Aug. 2, 2022

(54) FILTER MEDIUM AND METHOD FOR PRODUCING SUCH A FILTER MEDIUM

(71) Applicant: Mahle International GmbH, Stuttgart (DE)

(72) Inventors: Eva Boendel, Stuttgart (DE); Hein Martin, Stuttgart (DE)

(73) Assignee: Mahel International GmbH

( * ) Notice: Subject to any disclaimer, the term of this patent is extended or adjusted under 35 U.S.C. 154(b) by 497 days.

(21) Appl. No.: 16/314,596

(22) PCT Filed: Jun. 27, 2017

(86) PCT No.: PCT/EP2017/065874
§ 371 (c)(1),
(2) Date: Dec. 31, 2018

(87) PCT Pub. No.: WO2018/002062
PCT Pub. Date: Jan. 4, 2018

(65) Prior Publication Data
US 2019/0314749 A1 Oct. 17, 2019

(30) Foreign Application Priority Data
Jul. 1, 2016 (DE) .......................... 102016212056.5

(51) Int. Cl.
*B01D 46/00* (2022.01)
*B01J 41/04* (2017.01)
(Continued)

(52) U.S. Cl.
CPC .......... *B01D 46/0028* (2013.01); *B01J 41/04* (2013.01); *B01D 39/1623* (2013.01);
(Continued)

(58) Field of Classification Search
None
See application file for complete search history.

(56) References Cited

U.S. PATENT DOCUMENTS 3,871,950 A * 3/1975 Hashino ................... D01D 5/24
428/398
4,181,694 A * 1/1980 Hashino ................. B01D 61/18
210/500.23
(Continued)

FOREIGN PATENT DOCUMENTS

CN 101489425 A 7/2009
CN 103357451 A 10/2013
(Continued)

OTHER PUBLICATIONS

Espacenet translation of CN 101489425A, 2016, all pages https://worldwide.espacenet.com/patent/search/family/036998266/publication/CN101489425A?q=cn%20101489425 (Year: 2009).*
(Continued)

*Primary Examiner* — Christopher P Jones
*Assistant Examiner* — Brit E. Anbacht
(74) *Attorney, Agent, or Firm* — Fishman Stewart PLLC (57) ABSTRACT

A coating solution for producing a biofunctional surface coating and/or depth coating of a filter medium may include a solvent, an anti-pathogenic substance, an ion exchanger, and a polymeric cross-linking agent. The ion exchanger may be hygroscopic and may include functional cation exchanger groups with sulphonic acid groups.

20 Claims, 3 Drawing Sheets

(51) Int. Cl.
*B01D 39/16* (2006.01)
*B60H 3/06* (2006.01)

(52) U.S. Cl.
CPC .. *B01D 2239/0442* (2013.01); *B01D 2239/10* (2013.01); *B60H 3/0658* (2013.01)

(56) References Cited

U.S. PATENT DOCUMENTS

| | | | | |
|---|---|---|---|---|
| 4,341,636 | A * | 7/1982 | Harder | B01D 37/00 210/290 |
| 4,856,509 | A * | 8/1989 | Lemelson | A41D 13/1146 128/206.19 |
| 5,767,167 | A * | 6/1998 | Ferry | A61L 2/0017 521/149 |
| 5,783,502 | A * | 7/1998 | Swanson | A01N 25/10 424/78.17 |
| 5,783,608 | A * | 7/1998 | Sugo | B01D 39/1623 521/29 |
| 5,849,311 | A | 12/1998 | Sawan et al. | |
| 5,851,395 | A * | 12/1998 | Kawase | B01J 20/26 210/500.27 |
| 6,182,659 | B1 * | 2/2001 | Kawase | A61L 9/16 128/206.18 |
| 6,190,437 | B1 * | 2/2001 | Forsyth | B01D 46/0028 210/501 |
| 6,379,794 | B1 * | 4/2002 | Girgis | C03C 25/28 428/375 |
| 6,402,819 | B1 | 6/2002 | De Ruiter et al. | |
| 6,551,608 | B2 * | 4/2003 | Yao | A01N 25/10 424/409 |
| 7,029,516 | B2 * | 4/2006 | Campbell | B01D 39/16 55/524 |
| 8,329,034 | B2 * | 12/2012 | Waller, Jr. | B01D 39/1692 210/338 |
| 9,162,907 | B2 | 10/2015 | Kwon et al. | |
| 2003/0189005 | A1 * | 10/2003 | Inoue | B01J 47/014 210/660 |
| 2004/0241518 | A1 * | 12/2004 | Yang | B01J 35/065 429/494 |
| 2004/0250683 | A1 * | 12/2004 | Soane | B01D 46/10 96/226 |
| 2005/0235619 | A1 * | 10/2005 | Heinz | B01D 39/163 55/486 |
| 2005/0247608 | A1 * | 11/2005 | Collias | B01D 39/2062 210/97 |
| 2010/0107578 | A1 * | 5/2010 | Behrendt | D04H 1/728 55/385.2 |
| 2013/0183879 | A1 | 7/2013 | Lee et al. | |
| 2013/0264209 | A1 * | 10/2013 | Kwon | B01D 69/10 204/638 |
| 2014/0157990 | A1 | 6/2014 | Piry et al. | |
| 2016/0296871 | A1 | 10/2016 | Scope et al. | |
| 2017/0120178 | A1 * | 5/2017 | Schacht | A61L 9/00 |

FOREIGN PATENT DOCUMENTS

| | | |
|---|---|---|
| DE | 197 27 295 A1 | 1/1999 |
| DE | 100 22 871 A1 | 11/2001 |
| DE | 10 2008 048 385 A1 | 3/2010 |
| DE | 10 2008 048 385 A1 | 3/2010 |
| DE | 10 2011 104 628 A1 | 12/2012 |
| DE | 10 2012 013 760 A1 | 1/2014 |
| DE | 10 2012 013 760 A1 | 1/2014 |
| DE | 10 2013 021 071 A1 | 6/2015 |
| EP | 1 882 511 A2 | 1/2008 |
| WO | WO-01/70 391 A1 | 9/2001 |
| WO | WO-2003/039713 A1 | 5/2003 |
| WO | WO-2008/009651 A1 | 1/2008 |
| WO | WO-2012/168 185 A1 | 12/2012 |
| WO | WO-2012/177648 A2 | 12/2012 |
| WO | WO-2013/096689 A1 | 6/2013 |

OTHER PUBLICATIONS

Chinese Office Action dated Jul. 8, 2019 for copending China Patent Application No. 201780041243.1.
English translation of the Chinese Office Action dated Jul. 8, 2019 for copending China Patent Application No. 201780041243.1.
English abstract for EP-1 882 511.
German NPL document cited as E1: DocCheck Flexikon, Definition for the term "Pathogen", https://flexikon.doccheck.com/de/Pathogen, retrieved Sep. 30, 2020.
German NPL document cited as E2: Lexikon der Chemie, Definition for the term "hygroskopish", https://www.spektrum.de/lexikon/chemie/hygroskopisch/4311, retrieved Sep. 29, 2020.
German NPL document cited as E4: SCS GmbH, Sicherheitsdatenblatt "Kaliumperoxodisulfat", retrieved on May 6, 2016.
German NPL document cited as E5: Stellungnahme der ZKBS ur Riskiobewertun con Pseudomonas putida als Spender-oder Empfängerorganismus für gentechnisce Arbeiten gemäß § 5 Abatz 1 GenTSV, 2., geänderte Fassung, Feb. 2012.
German NPL document cited as E6: C.R. Tiemeyer, "Sulfonierte Copolymere als Additive fur Teifbohrzement: Synthese, Wirkung und kolloidchemisches Verhalten", Dissertation Technische Universitat Munchen, Lehrbereich Anorganische Chemie, Lehrstuhl fur Bauchemie, Munich 2014.
German NPL document cited as E7 M. Mania, "Einfluss algenburtiger Stoffe auf Flockungs- und Adsorptionsprozesse in der Wasseraufbereitung", Dissertation, Berlin 2006.
German NPL document cited as E9 Wikipedia, Eintrag "Natriumlaurylsulfat," https://de.wikipedia.org/wiki/Natriumlaurylsulfat, abgerufen am Sep. 30, 2020.
German NPL document cited as E10: Wikipedia, Eintrag "Poly(styrolsulfonsaure)" <https://de.wikipedia.org/wiki/Poly(styrolsulfonsaure)>, abgerufen am Sep. 30, 2020.
German NPL document cited as E11: Wikipedia, Eintrag "Divinylbenzole", https://de.wikipedia.org/wiki/Divinylbenzole, abgerufen am Sep. 30, 2020.
German NPL document cited as E12 Wikipedia, Eintrag "Azobis(isobutyronitril)", https://de.wikipedia.org/wiki/Azobis(isobutyronitril), abgerufen am Sep. 30, 2020.
German NPL document cited as E15: Chemical Portal, Eintrag "Essigsaure", https://www.chemikalienportal.de/sauren/essigsaure/essigss-auml-ure-60-techn.html, abgerufen am Oct. 1, 2020.
German NPL document cited as E16: ACTO GmbH, Actolind® w Solution, Produktbeschreibung.
German NPL document cited as E22: "5-2 Catatonic Polymerization of the Carbon-Carbon Double Bond", excerpt from Principles of Polymerization, Fourth Edition, 2004, pp. 374-375, John Wiley & Sons, Inc., Hoboken, New Jersey.
German NPL document cited as E23: K. Igarashi et al., "Effect of Astilbin in Tea Processed from Leaves of Engelhardtia chrysolepis on the Serum and Liver Lipid Concentrations and on the Erythrocyte and Liver Antioxidative Enzyme Activities of Rats", Bioscience, biotechnology, and biochemistry vol. 60,3 (1996): 513-5. doi:10.1271/bbb.60.513.
German NPL document cited as E24: R.M. Levin et al. , "Effect of oral Kohki tea on bladder dysfunction induced by severe partial outlet obstruction", J Urol. May 2002; 167(5):2260-6.
European Patent Office Communication of an Opposition dated Feb. 1, 2021 for copending European Patent Appl. No. 17739210.7.
Machine English translation for DE10 2008 048 385.
Machine English translation for DE10 2012 013 760.
Machine English translation for DE100 22 871.
German NPL document cited as E11: Wikipedia, Eintrag "*Divinylbenzole*", https:// Germande.wikipedia.org/wiki/Divinylbenzole, abgerufen am Sep. 30, 2020.
NPL document cited as E12 Wikipedia, Eintrag "*Azobis(isobutyronitril)*", https://de.wikipedia.org/wiki/Azobis(isobutyronitril), abgerufen am Sep. 30, 2020.
German NPL document cited as E22: Principles of Polymerization, Fourth Edition, John Wiley & Sons, Inc., Hoboken, New Jersey, 2004, Kapitel 5-2a-1.

(56) References Cited

OTHER PUBLICATIONS

German NPL document cited as E23: K. Igarashi et al., "Effect of Astilbin in Tea Processed from Leaves of Engelhardtia chrysolepis on the Serum and Liver Lipid Concentrations and on the Erythrocyte and Liver Antioxidative Enzyme Activities of Rats", Biosci. Biotech. Biochem., 60(3), 513, 515, 1996.

* cited by examiner

FILTER MEDIUM AND METHOD FOR PRODUCING SUCH A FILTER MEDIUM

CROSS-REFERENCE TO RELATED APPLICATIONS

This application claims priority to International Patent Application No. PCT/EP2017/065874 filed Jun. 27, 2017, and German Patent Application No. 10 2016 212 056.5, filed Jul. 1, 2016, the contents of both of which are hereby incorporated by reference in their entirety.

TECHNICAL FIELD

The present invention relates to a coating solution for producing a biofunctional surface coating and/or depth coating of a filter medium. The invention further relates to a method for the production of such a filter medium. The invention therefore relates to the use of the coating solution for producing the filter medium. Furthermore, the invention relates to a filter medium produced according to the method, with a filter material for filtering air in a passenger compartment of a motor vehicle. Finally, the invention relates to a filter element for a passenger compartment air filter of an air-conditioning system of a vehicle, which is produced with such a filter medium.

BACKGROUND

Filter media for cleaning the air in a passenger compartment are generally known from the prior art in a multiplicity of variant embodiments. With modern air-conditioning systems it is both possible to ventilate the passenger compartment with drawn-in and filtered air from the exterior and in recirculated-air operation with the air present in the vehicle interior or a mixture of both. Filter media have the task of filtering or respectively cleaning the air drawn-in from the exterior, which nowadays is furnished with a multiplicity of particles which are harmful to humans. The undesired, in part harmful matter in the air are generally pathogens, pollen, dusts or gases. Through the high number of different impurities in the air, the general need exists for filters which bind as far as possible a large number of the impurities from the air and prevent them from flowing into the passenger compartment. A frequently occurring problem here is the adsorption of odorous substances, which are also designated as "real gases" and which possess predominantly basic base molecules, such as for example ammonia, trimethylamine or triethylamine.

From DE 10 2013 021 071 A1 a filter medium, in particular for the filtering of air for the interior of motor vehicles, is known. The filter medium comprises a filter layer for the retention of particles, and an antimicrobial substance and an antiallergenic substance. The antimicrobial substance and also the antiallergenic substance are provided as additional layers which, with the filter layer for the retention of particles, are adjacent in an arbitrary arrangement. The antibacterial substances which are used here comprise in particular zinc pyrithione and octa-isothiazolone.

From EP 1 882 511 A3 a filter medium with bactericidal effect is known, in particular for the filtering of air for the interior of motor vehicles. The filter medium consists of at least one filter layer in which particulate impurities are able to be retained, and a bactericidal layer downstream of this filter layer. The bactericidal layer is arranged on the clean air side of the at least one filter layer and is spaced apart from the at least one filter layer by a spacer layer.

From DE 10 2011 104 628 A1 a filter medium with antimicrobial effect is known, in particular for the filtering of air for the interior of motor vehicles. The filter medium consists of at least a first filter layer, in which impurities are able to be retained, and a second filter layer adjacent to this first filter layer. The second filter layer is applied on the outflow side of the first filter layer and contains antimicrobial substances.

From WO 2003/039713 A1 a generic coating solution for producing a biofunctional surface coating or respectively depth coating of a filter medium is known. Hereby, an anti-pathogenic air filtration medium, in particular for an air conditioning system in buildings, is provided. The known air filtration medium has a fibre substrate with a plurality of intermingled fibres, which again are coated with a polymer. This coating offers an environment which can comprise an anti-pathogenic substance.

From WO 2008/009651 A1 a respirator mask is known, which is equipped with a filter medium which can have an ion exchanger and an anti-pathogenic substance.

A further frequently occurring problem in filter media, in particular with use in a vehicle air-conditioning system, is that for example bacteria, germs, fungi, algae and other microorganisms can accumulate in such a filter material and multiply. These microorganisms which are, in part, harmful to humans, can arrive through the air stream into the interior of the vehicle, whereby the vehicle occupants are exposed to these partly harmful organisms without protection.

SUMMARY

The present invention is concerned with the problem of indicating an improved embodiment for a filter medium of the type named in the introduction, or respectively for a filter element for a passenger compartment air filter of an air-conditioning system of a vehicle, which is produced with such a filter medium, which improved embodiment is distinguished in particular advantageously with respect to the problem of the growth and multiplication of microorganisms in the filter medium. The invention is furthermore concerned with the problem of the continuous and predetermined release of antiallergenic and antibacterial active substances in the case of a biofunctional coating of a filter material.

This problem is solved according to the invention by the subject of the independent claim(s). Advantageous embodiments are the subject of the dependent claim(s).

The invention is based on the general idea, in the case of a filter medium with a filter material, to provide an anti-pathogenic substance and an ion exchanger which, combined with water, forms an acidic environment. It has been found that such an ion exchanger in connection with an anti-pathogenic substance is harmful to a large number of microorganisms. In addition, the filter medium expediently does not constitute a suitable nutrient medium for such microorganisms. Through the acidic environment, the biological activity of the microorganisms is stopped or respectively at least reduced, which ultimately denotes a reduced impact on the vehicle occupants. The anti-pathogenic substance can, furthermore, be able to render at least partially harmless for example pollen particles and other allergens which can not be entirely retained by the filter material.

An embodiment is particularly advantageous here, in which the anti-pathogenic substance and the ion exchanger are formed in a single coating and/or in a single ply or layer of the filter material. Hereby, the filter material is given a high functional density. The coating here is preferably not a pure surface coating of the filter material, but rather a depth coating, which is also situated in the interior of the filter material. In the case of a filter material of fibres, the coating can be situated on the surface of the fibres and therefore everywhere on and in the filter material.

In an advantageous embodiment, the ion exchanger is configured as an ion exchange ply or ion exchange layer, wherein this ply or layer is, for its part, configured so as to be hygroscopic and contains ion exchange particles which form a toxic environment with water. Preferably, a cation exchanger with a functional sulphonic acid group is used as ion exchanger, wherein the cation exchanger is completely (matrix and functional group) water-soluble. The hygroscopic cation exchanger adsorbs water from the air stream and, in so doing, releases acidic protons. The acidic protons reduce or respectively stop the biological activities of bacteria, germs, fungi, algae and other microorganisms. The cation exchanger, which preferably consists of a sulphonated aliphatic and aromatic organic compound or at least has such a compound, acts on allergens in a denaturing manner, similarly to the anti-pathogenic substance. In addition, real gases (odorous substances), can be adsorbed in the formed acidic environment, because interactions occur between the acidic sulphonic acid groups and the predominantly basic base molecules of the real gases, such as ammonia, trimethylamine and triethylamine.

A further development with a high degree of sulphonation is advantageous, in which the cation exchanger which, combined with water, forms an acidic environment, has for example a pH value of a maximum of 3.0.

In a further advantageous embodiment, the anti-pathogenic substance has antiallergenic materials of antioxidative substances, in particular of polyphenols, such as for example catechins, tannins or flavonoids (also flavonoids). Antioxidative substances have a denaturing effect on allergens. Such antioxidative substances lead to functional loss by changing the secondary, tertiary and quaternary structure in allergens (proteins) and therefore act both in an allergen-deactivating and also bactericidal manner. In addition, the anti-pathogenic substance can also have an enzyme and/or any ligand, which can attach itself to the epitopes of the allergen which is to be deactivated. The ligands advantageously form a covalent bond, in order to thereby deactivate the allergen irreversibly.

According to the invention, the filter medium has, in addition to the anti-pathogenic substance and the ion exchanger, a polymeric cross-linking agent. The task of the polymeric cross-linking agent is the fixing or respectively cross-linking of the anti-pathogenic substance and the ion exchanger with the filter material as such. The soluble anti-pathogenic substance and also the soluble ion exchanger can be firmly connected with all conceivable carrier materials by means of the polymeric cross-linking agent. The cross-linking of the anti-pathogenic substance and of the ion exchanger with a filter carrier material therefore leads to a product with antimicrobial and antiallergenic properties. The polymeric cross-linking agent can function as matrix material for the embedding of the anti-pathogenic substance and also of the ion exchanger. The matrix of the polymer which is used can be any known polymeric basic structure which consists of repeating units containing hydrocarbons. The preferred highly sulphonated water-soluble polymer which is used can contain, particularly preferably, sulphonic acid groups both in the main chain and also in the side groups, wherein the sulphonated groups are preferably connected to the base structure by covalent single bonds. Preferred typical representatives of water-soluble polymers can be sulphonated polystyrene, sulphonated polymethylstyrene, sulphonated polyethylstyrene, and other sulphonated styrene derivatives, sulphonated polyacrylic acid, sulphonated polymethacrylic acid, sulphonated polyethacryl derivatives, polyvinyl sulphonic acid, and other sulphonated polyvinyl derivatives. Particularly preferably, the polymeric cross-linking agent is formed from polyvinyl alcohol, wherein a degree of hydrolysis and polymerisation must correspond to a desired water-solubility of the polymer. Polyvinyl alcohols with high degrees of hydrolysis have a low solubility in water. Water-soluble polyvinyl alcohol can be converted to a cross-linked water-insoluble secondary product through acid-catalysed dehydration. Expediently, through the concentration and through the reaction conditions for cross-linking of the polymeric cross-linking agent, the cross-linking density can be controlled, so that a chronologically delayed, preferably largely constant or uniform releasing of the antimicrobial substances and of the antiallergenic substances can be guaranteed. The releasing of the antibacterial and antiallergenic active substances can therefore be controlled over a specified period of time. Furthermore, a depot effect can be achieved through a higher cross-linking, which enables a slow, retarded releasing of the active substances over a longer period of time in constant concentration. The polymeric cross-linking and fixing of the active substances prevents, in addition, a so-called bleeding or respectively volatilization of the active substances.

A filter element according to the invention for a passenger compartment air filter of an air-conditioning system of a vehicle has a filter body, the filter material of which is formed by means of a filter medium of the type described above. Preferably, the filter material is pleated, therefore folded, in the filter body. The filter body can be configured here so as to be flat and even or annular. The associated filter element is then configured as a flat filter element or as a ring filter element. Basically, however, any other desired geometries are also possible for the filter body or respectively for the filter element, e.g. horseshoe-shaped filter elements are also known.

In a further advantageous embodiment, the filter element according to the invention can have several filter plies, which are either in direct contact with one another or are arranged spaced apart from one another. Filter plies adjoining one another can be glued to one another or thermally connected to one another, e.g. by plasticizing.

A coating solution according to the invention for producing a bifunctional surface coating and/or depth coating of a filter medium has in a solvent an anti-pathogenic substance, an ion exchanger and a polymeric cross-linking agent. The coating solution can be arranged both on a filter material and also in the latter. The filter material can be formed as base material for example from a fibre material, in particular from a laid fabric, a woven fabric, a fleece or a felt, wherein in particular chemical fibres, such as polyamide fibres, polyester fibres, polyacrylic fibres, polypropylene fibres or natural fibres can be used. The respectively individual fibres of the above-mentioned fibre materials can be surrounded or respectively coated by the coating solution entirely or at least partially. It is conceivable that the coating solution can basically be applied onto any medium. For example, with the use in a vehicle, in addition to the filter material per se, also any surfaces coming in contact with the inflowing air could also be applied with such a coating solution. Especially here, for example, inner surfaces of a filter housing and the inner sides of air ducts which are able to be flowed through are conceivable.

Water or organic solvents can serve as dissolvers (solvents) for the coating. Preferred solvents are water, alcohol, diols or polyols with low C-number, and preferably ethanol, i-propanol, propylene glycol, ethylene glycol, glycerine, ethylene glycol monoethyl ether, ethylene glycol monobutyl ether or an arbitrary mixture of these substances. In addition, the coating solution can contain surface-active substances such as for instance tensides or other components which improve the arrangement or respectively distribution of some substances present in the solution on a filter carrier material, and which reduce the surface tension of the filter material. Depending on the surface characteristics of the filter material, both cationic and/or anionic and/or non-ionic and/or amphoteric tensides can be added. Preferably, an anionic tenside can be used, whereby the cross-linking is significantly improved between a hydrophobic filter carrier material, the anti-pathogenic substance, the ion exchanger and the polymeric cross-linking agent.

Preferably, the solvent can be based on a water base, therefore can consist of water to more than 50% by weight or to at least 75% by weight. Hereby, the coating solution, and therefore ultimately also the coating, can be realized at a particularly economical price.

In an advantageous embodiment of the coating solution according to the invention, the concentration of the ion exchanger, which is formed for example by polystyrene acid, in the coating solution can lie between 1% by weight and 25% by weight, and preferably between 5% by weight and 10% by weight.

In a further advantageous embodiment of the coating solution, the concentration of the polymeric cross-linking agent, which is formed for example from polyvinyl alcohol, in the coating solution can lie between 0.1% by weight and 30% by weight, and preferably between 0.3% by weight and 10% by weight.

In the method according to the invention for the production of such a filter medium by coating of the filter material, such a filter material is brought in contact with the coating solution which is described above. This takes place for example by spraying on, inserting or respectively immersing or applying. By vaporization of the coating solution, the anti-pathogenic substance, the ion exchanger and the polymeric cross-linking agent can be securely arranged on and/or in the filter material. Furthermore, the same effect can be achieved through an acid-catalysed dehydration. The filter material can be described as a cross-linked, water-insoluble secondary product. This means that on the one hand an insoluble network is formed from soluble reaction partners, by means of a fixed tannic acid, and on the other hand that through such an insoluble network the connection to the filter material is intensified, both through an interaction and also through embedding of the polymer network into the filter material. The polymeric cross-linking agent in the coating solution leads, under acidic catalysis of the sulphonic acid groups during vaporization of the solvent to the polymerisation of the cross-linking agent and thereby both to the embedding and also to the cross-linking of the sulphonic acid with the polymeric cross-linking agent, which after the acid- and temperature-catalysed cross-linking forms an insoluble double and triple cross-linked network. The method therefore leads from a soluble coating solution to an insoluble coating with antimicrobial and antiallergenic properties, which is securely fixed on and/or in the filter material. The predominant reactions in the named chemical processes are the cross-linkings, which are desired according to the invention, through the formation of so-called ether bridges in the aliphatic and aromatic nucleophilic substitution and the competing β-elimination through the formation of conjugated double bonds.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained further in the following description, wherein the same reference numbers refer to identical or similar or functionally identical components.

BRIEF DESCRIPTION OF THE DRAWINGS

There are shown, respectively diagrammatically.

DETAILED DESCRIPTION

Figure 1:
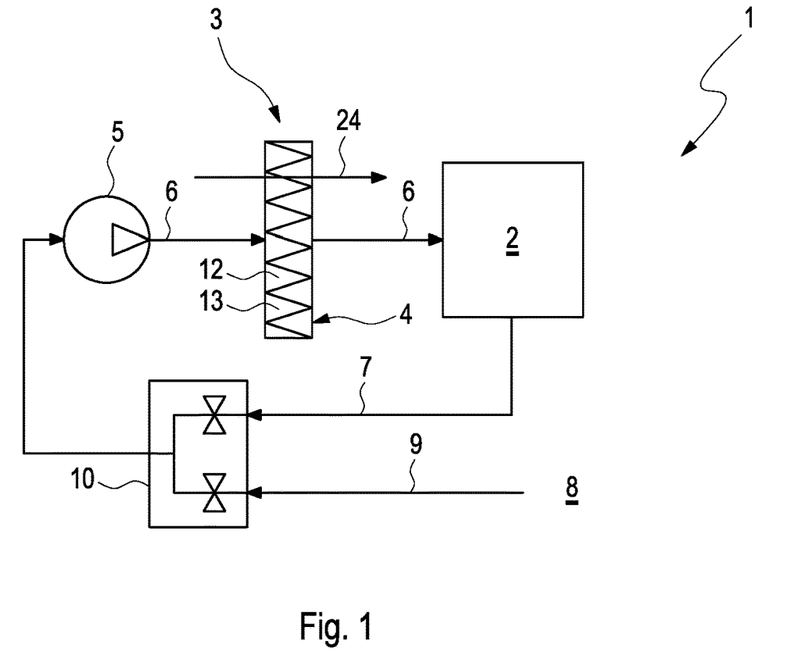
FIG. 1 shows a highly simplified schematic diagram, in the manner of a circuit diagram, of an air-conditioning system.

According to FIG. 1, an air-conditioning system 1, which serves for the air conditioning of a passenger compartment 2 of a vehicle, which is otherwise not shown, comprises a passenger compartment air filter 3, which is equipped with at least one passenger compartment air filter element 4, which has a filter medium 12. The passenger compartment air filter 3 can also be designed in the following in an abbreviated manner as air filter 3. The passenger compartment air filter element 4 can also be designated in the following in an abbreviated manner as filter element 4. The air-conditioning system 1 further comprises a fan 5 for producing an air stream 6, which is delivered to the passenger compartment 2. In so doing, the air stream 6 is directed through the air filter 3 or respectively through the filter element 4, whereby the air stream 6 is filtered or respectively cleaned. In so doing, the fan 5 can draw in recirculating air 7 from the passenger compartment 2. In addition, the fan 5 can draw in fresh air 9 from the exterior from an environment 8 of the vehicle. By means of a flap arrangement 10, a switchover can be carried out between a recirculating air operation, in which only recirculating air 7 is drawn in and delivered to the passenger compartment 2, a fresh air operation, in which only fresh air 9 is drawn in from the exterior and is delivered to the passenger compartment 2, and a mixed air operation, in which both recirculating air 7 and also fresh air 9 are drawn in and delivered to the passenger compartment 2. Further typical components of the air-conditioning system 1, such as e.g. a heating device and a cooling device, are not illustrated here, in order to ensure clarity.

The filter element 4, which is arranged in a filter housing 36, has a filter body 11, which is formed by means of a filter medium 12, which has in turn a filter material 13. Expediently, the filter material 13 is pleated or respectively folded in the filter body 11, in order to achieve as large a surface as possible. In the example of FIG. 1, the filter body 11 is illustrated as being plate-shaped and flat. Basically, an annular filter body 11 can also be provided. In operation of the air-conditioning system 1, the air stream 6 flows through the filter element 4 or respectively the filter body 11 and therefore ultimately also the filter medium 12 in a through-flow direction 24. Accordingly, depending on structure, the filter medium 12 can have a through-flow direction 24 provided for the correct installation state or respectively usage state, which direction must be maintained so that the filter material 13 or respectively the filter element 4 equipped therewith can develop the intended filtration effect(s).

Figure 2:
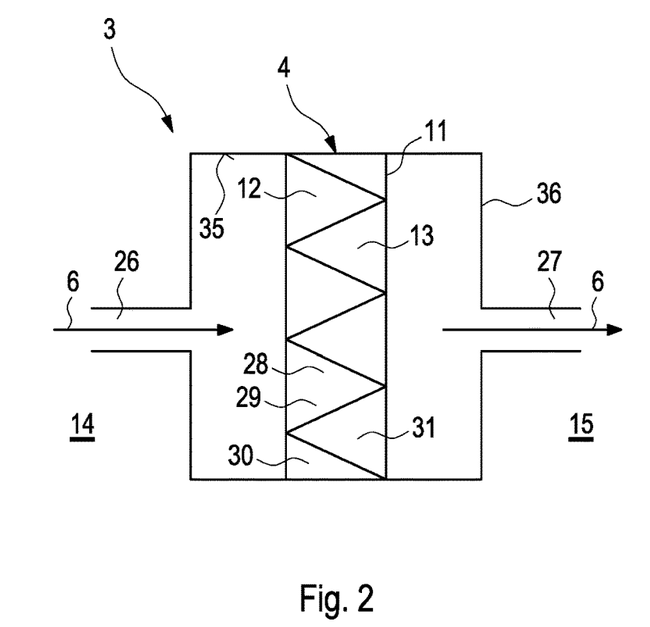
FIG. 2 shows a highly simplified sectional view of a passenger compartment air filter with a filter element, which has a filter body.

FIG. 2 shows diagrammatically such an air filter 3, which is formed from a filter housing 36, a filter body 11 and a filter element 4. On an inflow side 14 the filter housing 36 has an inlet opening 26 for the air stream 6. Expediently, on an outflow side 15 of the filter housing 36 in addition an outlet opening 27 is arranged, for directing the air stream 6 out to the passenger compartment 2. The filter element 4 is formed from a filter medium 12, which has a filter material 13. The filter material 13 as base material can be formed for example from a fibre material, in particular from a laid fabric, a woven fabric, a fleece or a felt, wherein in particular chemical fibres, such as polyamide fibres, polyester fibres, polyacrylic fibres, polypropylene fibres or natural fibres can come into use.

The filter medium 12 has at least one anti-pathogenic substance 28 and an ion exchanger 29 which, combined with water which is adsorbed from the air stream 6, forms an acidic environment 31. The ion exchanger 29 is hygroscopic and has cation exchanger particles, in particular with sulphonic acid groups. Preferably, the ion exchanger 29 is water-soluble and is formed from a polystyrene sulphonic acid. The anti-pathogenic substance 28 is formed from antioxidative substances and/or enzymes, in particular from polyphenols. The anti-pathogenic substance 28 and the ion exchanger 29 are held on the filter material 13 by a polymeric cross-linking agent 30.

The filter material 13 is preferably coated with a coating solution 25, which has an anti-pathogenic substance 28, an ion exchanger 29, a polymeric cross-linking agent 30 and a solvent 32. The filter medium 12 therefore constitutes a coated filter material 13. The biofunctional coating 34 is described more precisely in the following. The coating solution 25 can optionally also be applied or respectively coated with the inner surfaces 35 of the filter housing 36 and with the inner surfaces of air channels, which are not shown, which are expediently arranged at the openings 26, 27 of the inflow side 14 and of the outflow side 15.

Figure 3:
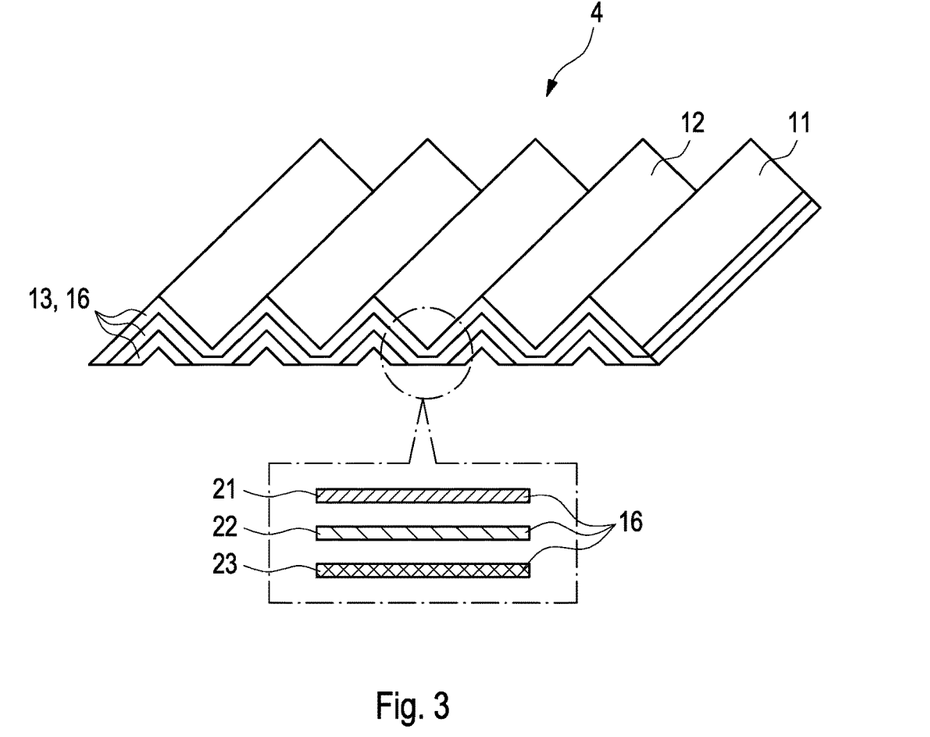
FIG. 3 shows a highly simplified view of a filter medium in the form of a pleated filter material in three-ply configuration.

FIG. 3 shows diagrammatically a filter element 4, which is formed from several filter plies 16. The functional plies 21, 22, 23 can be formed from different filter media 12, therefore with differing filter properties. For example, only one of the three functional plies 21, 22, 23 can have the antibacterial and antiallergenic active substances of the coating solution 25 according to the invention, and the other two plies can be designed as a particle filter, in order for example to pre-filter coarser particles. In addition, the individual functional plies 21, 22, 23 have within the filter element 4 a preferred arrangement or respectively sequence, in which advantageously the functional ply 21, 22, 23 which is treated with the coating solution 25 is not arranged as the first functional ply 21, 22, 23 on the inflow side 14. In an example embodiment, a functional ply 21, 22, 23 can be formed from a filter medium 12, which has only an ion exchanger (29) and a polymeric cross-linking agent (30). The functional plies 21, 22, 23 are either in direct contact with one another or are arranged spaced apart from one another. Functional plies 21, 22, 23 adjoining one another can be glued to one another or connected thermally with one another, e.g. by plasticizing. The filter ply 16 as such can also be formed in one piece, by the biofunctional coating 34 being arranged only partially in the filter material 13.

Figure 4:
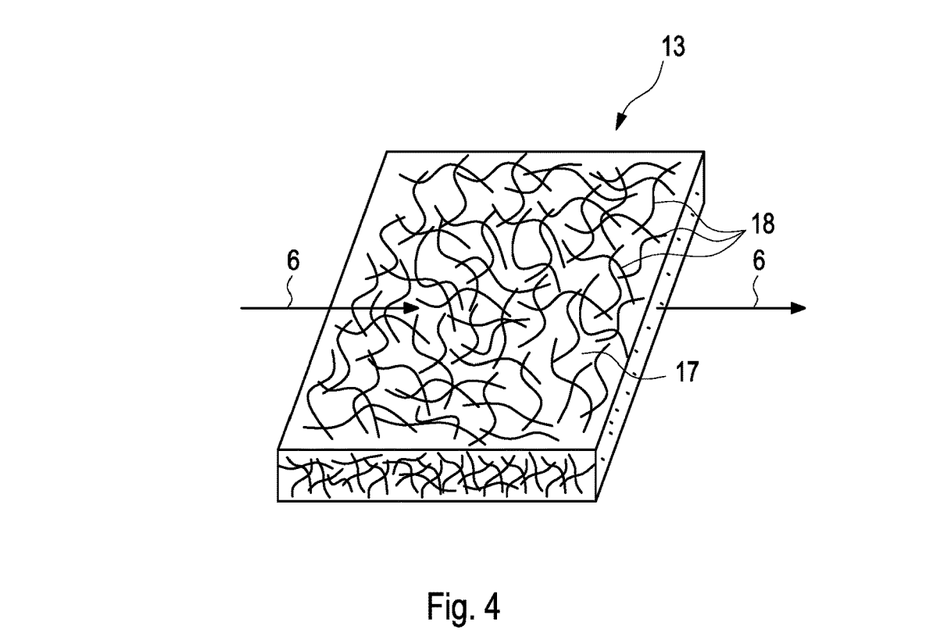
FIG. 4 shows a highly simplified view of the filter material.

FIG. 4 shows diagrammatically a filter material 13 with a laid fabric formed from fibre material 17. The laid fabric has a plurality of individual fibres 18, which are connected in scattered disorder and with one another. The filter material 13 is distinguished in that an air stream 6 can flow through. Here, the particulate impurities situated in the air are partially caught and are therefore prevented from being streamed into the passenger compartment 2 by the air stream 6.

Figure 5:
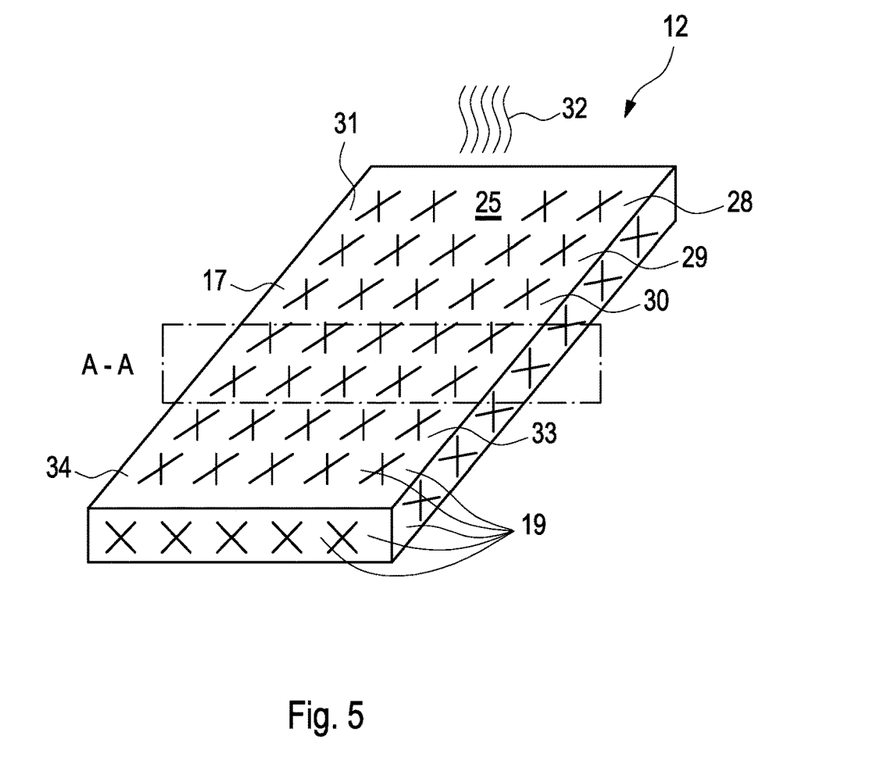
FIG. 5 shows a highly simplified view of the filter medium, comprising a surface-coated and depth-coated filter material after extraction of a solvent.

FIG. 5 shows diagrammatically a filter medium 12, comprising a filter material 13 after extraction of a solvent 32 from the coating solution 25. The coating solution 25 is used for producing a biofunctional surface coating 19 and/or depth coating 20 of a filter material 13. After vaporization under acidic catalysis of the solvent 32, the coated filter material 13 is designated as filter medium 12. The coating solution 25 has in a solvent 32 an anti-pathogenic substance 28, an ion exchanger 29 and a polymeric cross-linking agent 30, wherein the anti-pathogenic substance 28 of an antiallergenic substance and the ion exchanger 29 has both antiallergenic and also antibacterial properties and preferably contains a strongly acidic functional sulphonic acid group or at least is formed from the latter. The individual fibres 18 of the filter material 13 are surrounded or respectively coated entirely or at least partially by the biofunctional coating 34. By extraction of the solvent 32 from the coating solution 25 and by acid-catalysed reaction with the sulphonic acid group of the cation exchanger, there becomes from the previously water-soluble polymeric cross-linking agent 30 a water-insoluble polymeric cross-linking agent 30, which binds both the anti-pathogenic substance 28 and also the ion exchanger 29 securely to the fibre material 17. The soluble anti-pathogenic substance 28 and also the soluble ion exchanger 29 can be securely connected with all conceivable carrier materials by means of the polymeric cross-linking agent 30. The cross-linking of the anti-pathogenic substance 28 and of the ion exchanger 29 with the filter material 13 therefore leads to such a filter medium 12 with antimicrobial and antiallergenic properties. The polymeric cross-linking agent 30 can function as matrix material for the embedding of the anti-pathogenic substance 28 and also of the ion exchanger 29. Through the respective concentration of the polymeric cross-linking agent 30 in the coating solution 25, a cross-linking density can be controlled, so that a chronologically constant, uniform releasing of the antimicrobial substances and of the antiallergenic substances can be guaranteed.

The solvent 32 in the coating solution 25 preferably has anionic tensides 33, which lead to an improved arrangement or respectively distribution of the anti-pathogenic substance 28, of the ion exchanger 29 and of the polymeric cross-linking agent 30, on the filter material 13. In addition, the concentration of the ion exchanger 29 in the coating solution 25 lies between 1% by weight and 25% by weight and preferably between 5% by weight and 10% by weight. The concentration of the polymeric cross-linking agent 30 in the coating solution 25 lies between 0.1% by weight and 30% by weight and preferably between 0.3% by weight and 10% by weight.

Figure 6:
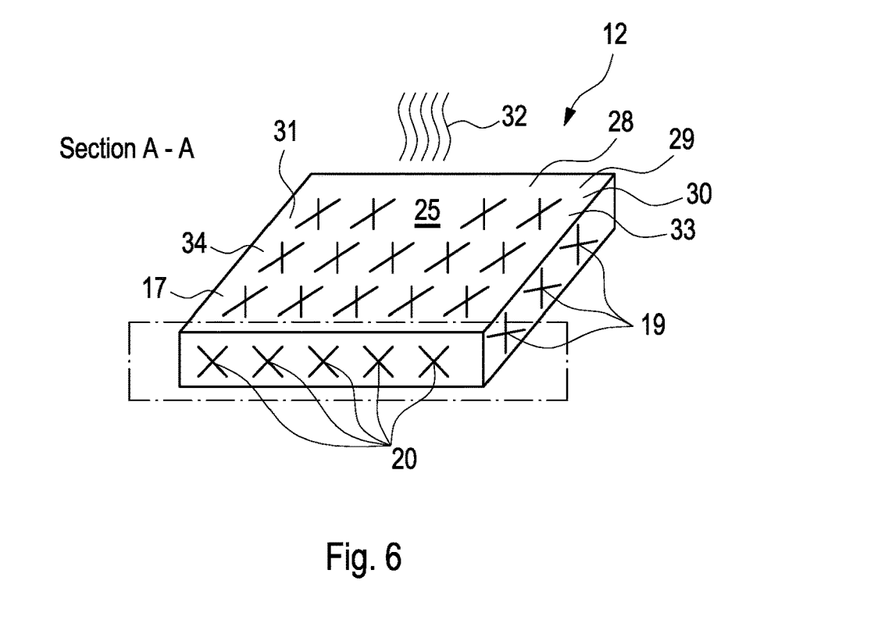
FIG. 6 shows a sectional illustration according to a section plane A-A of FIG. 5.

FIG. 6 shows a diagrammatic sectional illustration of the filter medium 12 from the preceding FIG. 5. By this sectional illustration, it is to be clarified that the biofunctional coating 34 serves not only as surface coating 19 but significantly also as depth coating 20. The anti-pathogenic substance 28 and the ion exchanger 29 are therefore also situated embedded in the polymeric cross-linking agent 30 in the interior of the filter material 13.

The invention claimed is:

1. A filter medium for filtering air in a passenger compartment of a motor vehicle, comprising:
   a filter material;
   an anti-pathogenic substance, an ion exchanger, and a polymeric cross-linking agent respectively arranged at least one of (i) on the filter material and (ii) in the filter material;
   the ion exchanger configured to activate the polymeric cross-linking agent;
   wherein the anti-pathogenic substance and the ion exchanger are fixed on the filter material via the polymeric cross-linking agent when activated by the ion exchanger;
   wherein the ion exchanger is hygroscopic and includes functional cation exchanger groups with sulphonic acid groups; and
   wherein the polymeric cross-linking agent is configured as at least one of a retarding matrix and a matrix material such that the anti-pathogenic substance connected therein and the ion exchanger are released over a predetermined period of time.

2. The filter medium according to claim 1, wherein the ion exchanger includes a water-soluble sulphonated aliphatic and aromatic organic compound with an ion exchanger capacity.

3. The filter medium according to claim 1, wherein the anti-pathogenic substance is configured in an antibacterial and antiallergenic manner.

4. The filter medium according to claim 1, wherein the anti-pathogenic substance is composed of at least one of a plurality of antioxidative materials, a plurality of enzymes, and a plurality of suitable ligands.

5. The filter medium according to claim 1, wherein the anti-pathogenic substance includes a plurality of polyphenols.

6. The filter medium according to claim 1, wherein the polymeric cross-linking agent, in a non-cross-linked state, is a water-soluble cross-linking agent which is convertable to a water-insoluble cross-linking agent when activated.

7. The filter medium according to claim 6, wherein the water-soluble cross-linking agent is activatable via acid-catalysed dehydration.

8. The filter medium according to claim 1, wherein the filter medium is produced via a process including:
   bringing the filter material into contact with the anti-pathogenic substance, the ion exchanger, and the polymeric cross-linking agent via a coating solution including a solvent, the anti-pathogenic substance, the ion exchanger, and the polymeric cross-linking agent;
   securely arranging the anti-pathogenic substance, the ion exchanger, and the polymeric cross-linking agent respectively at least one of (i) on the filter material and (ii) in the filter material via vaporizing the solvent; and
   fixing the anti-pathogenic substance and the ion exchanger to the filter material via activating the polymeric cross-linking agent with the ion exchanger.

9. The filter medium according to claim 8, wherein the solvent includes at least one of water, alcohol, diols, polyols, ethanol, i-propanol, propylene glycol, ethylene glycol, glycerine, ethylene glycol monoethyl ether, and ethylene glycol monobutyl ether.

10. The filter medium according to claim 8, wherein the solvent includes at least one of cationic tensides, anionic tensides, non-ionic tensides, and amphoteric tensides.

11. The filter medium according to claim 8, wherein the solvent is composed of water at more than 50% by weight.

12. The filter medium according to claim 8, wherein a concentration of the ion exchanger in the coating solution is 1% by weight to 25% by weight.

13. The filter medium according to claim 8, wherein a concentration of the polymeric cross-linking agent in the coating solution is 0.1% by weight to 30% by weight.

14. The filter medium according to claim 8, wherein the solvent includes anionic tensides.

15. The filter medium according to claim 8, wherein a concentration of the polymeric cross-linking agent in the coating solution is 0.3% by weight to 10% by weight.

16. The filter medium according to claim 1, wherein the polymeric cross-linking agent includes a polyvinyl alcohol.

17. The filter medium according to claim 1, wherein the anti-pathogenic substance, the ion exchanger, and the polymeric cross-linking agent are respectively arranged both (i) on the filter material and (ii) in the filter material.

18. The filter medium according to claim 1, wherein the ion exchanger is configured to provide an acidic environment having a pH value of 3.0 or less when combined with water.

19. A filter element of a passenger compartment air filter of an air-conditioning system of a vehicle, comprising a filter medium including:
   a filter material;
   an anti-pathogenic substance, an ion exchanger, and a polymeric cross-linking agent respectively arranged at least one of (i) on the filter material and (ii) in the filter material;
   the ion exchanger configured to activate the polymeric cross-linking agent;
   wherein the anti-pathogenic substance and the ion exchanger are fixed on the filter material via the polymeric cross-linking agent when activated by the ion exchanger;
   wherein the ion exchanger is hygroscopic and includes functional cation exchanger groups with sulphonic acid groups; and
   wherein the polymeric cross-linking agent is configured as at least one of a retarding matrix and a matrix material such that the anti-pathogenic substance connected therein and the ion exchanger are released over a predetermined period of time.

20. A filter medium for filtering air in a passenger compartment of a motor vehicle, comprising:
   a filter material;
   an anti-pathogenic substance, an ion exchanger, and a polymeric cross-linking agent respectively arranged at least one of (i) on the filter material and (ii) in the filter material;

the ion exchanger configured to activate the polymeric cross-linking agent;

wherein the anti-pathogenic substance and the ion exchanger are fixed on the filter material via the polymeric cross-linking agent when activated by the ion exchanger;

wherein the ion exchanger is hygroscopic and includes functional cation exchanger groups with sulphonic acid groups; and wherein the polymeric cross-linking agent includes a polyvinyl alcohol.

* * * * *